United States Patent [19]

Koh et al.

[11] Patent Number: 5,609,904
[45] Date of Patent: Mar. 11, 1997

[54] WHIPPING CREAM COMPOSITIONS POSSESSING A LOWERED FAT CONTENT AND IMPROVED ACID RESISTANCE AND FREEZE RESISTANCE, AND PROCESS FOR PRODUCING THE SAME

[75] Inventors: Hen-Sik Koh, Ohtsu; Ichizo Hayama, Settsu, both of Japan

[73] Assignee: Asahi Foods Co., Ltd., Kyoto, Japan

[21] Appl. No.: 489,388

[22] Filed: Jun. 12, 1995

[30] Foreign Application Priority Data

Dec. 1, 1994 [JP] Japan .................................. 6-341148

[51] Int. Cl.⁶ .................................. A23C 13/12; A23L 1/19
[52] U.S. Cl. .......................... 426/565; 426/570; 426/602
[58] Field of Search .................................. 426/570, 116, 426/564, 602, 565

[56] References Cited

U.S. PATENT DOCUMENTS

| | | | |
|---|---|---|---|
| 3,787,216 | 1/1974 | Wingerd et al. | 426/570 |
| 3,944,680 | 3/1976 | Van Pelt et al. | 426/564 |
| 4,370,353 | 1/1983 | Yagi et al. | 426/570 |
| 4,375,485 | 3/1983 | van Gennip | 426/570 |
| 4,396,638 | 8/1983 | Edo et al. | 426/564 |
| 4,461,777 | 7/1984 | Murase et al. | 426/330.6 |
| 4,582,714 | 4/1986 | Ford et al. | 426/564 |
| 4,798,734 | 1/1989 | Kaneda | 426/565 |
| 4,888,194 | 12/1989 | Anderson et al. | 426/570 |

*Primary Examiner*—Jeannette Hunter
*Attorney, Agent, or Firm*—Jacobson, Price, Holman & Stern, PLLC

[57] ABSTRACT

A whipping cream composition includes (a) 35–70 weight % total solids including (i) 16–40 weight % oil and fat, and (ii) 0.3 to 6 weight % combined casein protein and whey protein, having a weight ratio of casein protein/whey protein of 0.24 to 3.8; (b) an emulsifier including based on the composition, 0.01 to 0.5 weight % lecithin, 0.05 to 1.2 weight % saturated fatty-acid ester of a polyglycerol having a mean glycerol polymerization degree of not less than 5 in an HLB value of not less than 9, and 0.02 to 0.6 weight % saturated fatty acid ester of a polyglycerol having a mean glycerol polymerization degree of not less than 2 in an HLB value of less than 7, and (c) 0.05 to 5 weight %, based on the composition, of at least one edible fiber selected from the group consisting of cellulose, hemicellulose, sparingly digestive dextrin, modified starch, and a combination thereof.

28 Claims, No Drawings

5,609,904

WHIPPING CREAM COMPOSITIONS POSSESSING A LOWERED FAT CONTENT AND IMPROVED ACID RESISTANCE AND FREEZE RESISTANCE, AND PROCESS FOR PRODUCING THE SAME

BACKGROUND OF THE INVENTION

1) Field of the Invention

The present invention relates to whipping creams which remain stable over a wide range of pH values; have a lowered fat content and also can be composed of milk fat solely to find direct application in the final uses; can be whipped as such to offer excellent flavor; show improved acid resistance sufficiently to permit formulation of souring agents to thereby produce stable whipped cream even after the resultant mix shows a pH value as low as pH 3.8; and possess improved freeze resistance in that they stay stable in terms of shape retention, water separation and the like after being frozen and thawed or unfrozen. Furthermore, the present invention is concerned with creams (hereinafter referred to as "pre-whipped cream") which, after once being whipped, can be filled in a whipping bag, frozen, then unfrozen and flowered for the second time. Furthermore, this invention relates to creams inclusive of pre-whipped creams having a lowered fat content and improved freeze resistance which are suited for use in the neutral pH range and in particular, to whipping creams which can be suitably used in the manufacture of aseptic products.

2) Background Art

Whipping creams have heretofore been used in various manners as a topping or filling material for confectionery and bakery products. However, such whipping creams, which in many instances show a pH value in the vicinity of neutrality and a fat content as high as not less than 40% by weight, are easy to be held in the stable emulsified state; they provide easily whipped creams with excellent whipping property and shape retention, whereas in turn, they suffer from the disadvantage or shortcoming that they presents invariably uniform, monotonous flavor.

In recent years, nevertheless, there is increasingly demanded a refreshing whipped cream (namely, an acid-resistant whipped cream) which has a low fat content and is formulated with a souring agent suck as various fruits, fruit juices and yogurts, as may be reflected by the increasingly diversified taste.

With a specific aim to improvement of productivity and working efficiency in making cakes, also, there exists a strong demand for a whipping cream which shows improved freeze resistance enough to permit freezing treatment after whipping, followed by unfreezing for direct use. On the other hand, there is greatly demanded a so-called prewhipped cream which can be subjected to the sequential steps of whipping a cream composition; filling the whipped cream in a bag; keeping it under freeze; causing the same to become unfrozen; and squeezing the cream out of the bag to allow flowering. Some pre-whipped creams based on vegetable oils and fats have been put on the market, but such creams are inferior in flavor; consequently, there is an enormous demand for pre-whipped creams having an increased milk fat content or those having souring agents formulated therein.

Yet, addition of acid substances such as the ones described above not only brings about coagulation of proteins contained in a whipping cream, but also causes emulsification to be destroyed and the whipping function to deteriorate, resulting in water and oil separations and failure to achieve satisfactory overrun, and in the case of the whipping cream with a low fat content, such phenomenon has raised a particularly important problem.

As a substance acting to produce the preventive effect against coagulation of proteins in the acid pH range, there are used acid-resistant stabilizers such as pectin, carboxymethylcellulose and propylene glycol arginate, but such acid resistance stabilizers suffer from some defects; namely, they provide the resultant whipped cream with unsatisfactory emulsion stability and cause its overrun to deteriorate. In addition, such stabilizers, which impair the flavor of the resulting cream, can in no way be used in milk-fat based creams in which a particular emphasis is placed on the flavor, although they are usable unsatisfactorily in whipped cream based on vegetable oils and fats. Presently, any acid-resistant whipping cream based totally on milk fat has not yet been commercialized.

With reference to the emulsification system for acid-resistant whipping creams, there are proposed (1) a method of using a fatty acid ester of sorbitan, lecithin and a fatty acid ester of sucrose as an emulsifier (Japanese Unexamined Patent Publication No. 145,959/1978), (2) a method of utilizing a fatty acid ester of a polyglycerol and an organic acid ester of a monoglyceride in combination (Japanese Unexamined Patent Publication No. 111,639/1983), (3) a method of using a fatty acid ester of a polyglycerol and a stabilizer (naturally occurring polysaccharide or cellulose derivative) in combination (Japanese Unexamined Patent Publication No. 209,947/1983), (4) a method of utilizing in combination lecithin, a fatty acid ester of sucrose and not less than two kinds of fatty acid esters of a polyglycerol consisting of unsaturated and saturated fatty acids as a fatty acid constituent (Japanese Unexamined Patent Publication No. 54,635/1985), (5) a method of utilizing a fatty acid ester of a polyglycerol containing unsaturated and saturated fatty acids as a constituent fatty acid (Japanese Unexamined Patent Publication No. 112,747/1992), (6) a method of utilizing a fatty acid ester of a polyglycerol and chitosan in combination (Japanese Unexamined Patent Publication No. 144,660/1992), and the like. However, these methods are far from being fully satisfactory in that the resultant whipping cream undergoes solidification or coagulation during transport and the whipping cream can be whipped but only with inferior shape retention or characterized by a deteriorated flavor. The creams produced by these methods, when subjected to UHT treatment in order to produce a cream being preservable for a long period of time, come to require a prolonged length of time for foaming, and the resulting foamed cream encounters the problems such as inferior shape retention and increased tendency to give rise to water separation.

For the purpose of preventing coagulation of proteins in the acid pH range, there are proposed a treatment of proteins with protease (Japanese Unexamined Patent Publication No. 23,867/1989), use of whey protein hydrolyzed with an enzyme (Japanese Unexamined Patent Publication No. 257, 838/1990), and utilization of an alkali metal salt of citric acid (Japanese Unexamined Patent Publication No. 51,054/ 1989), but these methods are not entirely satisfactory in terms of flavor.

A whipping cream requires the delicate, sophisticated technique and skill in achieving perfect foaming, and can only be cool-preserved hygienically for a storage period as short as 3 to 4 days. For the reason of this, a whipping cream is required that permits cakes with use of the resultant whipped cream to be produced in large quantities and then freeze-preserved, followed by unfreezing in required quantities for serving. However, such a whipping cream, on the occasion of freezing, undergoes emulsification destruction and protein denaturation accompanied by cryohydrate formation, and brings about quality deterioration such as cracking and shape loss. Consequently, freeze resistance to overcome such a problems is required of such whipping cream and is considered of particular importance in the case of a whipping cream with a lowered fat content.

On the other hand, the pre-whipped cream, which can allow the filling of a whipped cream in a bag, followed by storage under freeze and unfreezing for flowering on the occasion of necessity, is advantageous in that it is practically easy to be handled and can be flowered freely, and is highly demanded and required. In squeezing for flowering such whipped cream out of a bag after being unfrozen, nevertheless, there are faced the problems being different from the above-mentioned freeze resistance, such as coarse surface of the resultant whipped cream. Although some pre-whipped creams based on vegetable oils and fats have been made commercially available, they exhibit inferior flavor, and there is needed a pre-whipped cream with an increased content of milk fat enough to provide better flavor or a pre-whipped cream formulated with a souring agent, neither of which however has been commercialized yet.

SUMMARY OF THE INVENTION

The present invention has as its objective to provide (1) better-flavored creams which have a lowered fat content; permit milk fat alone to be used as a source of oil and fat; can be whipped as such to provide shape retention equal or comparable to a whipped cream having a higher fat content; and show a high overrun value and improved water separation and freeze resistance, (2) creams which retain a high overrun value and are entirely free from any trouble and problem in terms of shape retention, water separation, freeze resistance, etc. after addition of various souring agents until they are brought to an acid pH range of pH 3.8 to 5, (3) creams which can be subjected to UHT treatment without causing any trouble and problem in terms of foaming time, overrun, shape retention, water separation, freeze resistance, etc., (4) creams which can be used as a pre-whipped cream in the neutral pH range, and (5) compositions capable of functioning as a cream which can allow addition of various souring agents to thereby find application as a pre-whipped cream even in the acid pH range, as well as a process for producing the same.

DETAILED DESCRIPTION OF THE PREFERRED EMBODIMENTS

The cream-like compositions of the present invention which comprise 16 to 40% by weight of an oil and fat and 0.3 to 6% by weight of a protein being admixed with water containing sugar materials, etc. to be brought into emulsification to a total solid content of 35 to 70% by weight, wherein the said compositions are composed essentially of the following:

(a) A protein being composed of casein protein and whey protein and having a weight ratio of casein protein/whey protein of 0.24 to 3.8, provided however that such protein may have a weight ratio of casein protein/whey protein of not less than 3.8, when they are utilized as a whipping cream or pre-whipped cream intended for use in the neutral pH range alone;

(b) An emulsifier consisting of, on the basis of the resultant whipping cream, 0.01 to 0.5% by weight of lecithin, 0.05 to 1.2% by weight of a saturated fatty-acid ester of a polyglycerol (namely, pentaglycerol or higher polymers) having a mean glycerol polymerization degree of not less than 5 and an HLB value of not less than 9, and 0.02 to 0.6% by weight of a saturated fatty-acid ester of a polyglycerol (namely, diglycerol or higher polymers) having a mean glycerol polymerization degree of not less than 2 and an HLB value of less than 7, provided however that 0.01 to 0.3% by weight of an unsaturated fatty-acid ester of a polyglycerol (namely, diglycerol or higher polymers) having a mean glycerol polymerization degree of not less than 2 may be used in combination, when they are used in the neutral pH range alone; and (c) 0.05 to 5% by weight, on the basis of the resultant whipping cream, of one or not less than two edible fibers selected from a group consisting of cellulose, hemicellulose and sparingly digestive dextrin, and/or modified starch.

As an oil and fat which constitute the oil phase of the whipping cream, there may be mentioned vegetable and animal oils and fats such as soybean oil, corn oil, cotton seed oil, coconut oil, palm oil, palm kernel oil, rapeseed oil, peanut oil, rice bran oil, safflower oil, beef tallow, lard, butter, fresh cream and fish oil, and processed oils and fats derived from the same through various treatments such as hardening, ester exchange and fractionation, and the oils and fats having an ascending melting point of 26° to 40° C. are used at ratios of 16 to 40% by weight. In cases where such oils and fats show an ascending melting point of less than 26° C. or are used at ratios of less than 16% by weight, the resultant whipped creams exhibit poor shape retention. In the case of those showing an ascending melting point of not less than 40° C., the resulting whipped creams tend to lose the feeling of smooth melting in the mouth, while in the case of those being used at ratios of not less than 40% by weight, the resultant whipped creams fall out of the objective of the present invention; namely to provide creams with a lowered fat content.

The protein is used in the whipping cream at ratios of 0.5 to 6% by weight, and this composition is one of the characteristic features of the present invention. As is well known, the milk protein is composed of casein protein (77 to 84% by weight) and whey protein (23 to 16% by weight), and when the milk protein is used as such in a oil-in-water type emulsion, the emulsification system, without exception, turns unstable upon souring or acidification. This phenomenon becomes much more conspicuous when heat treatment is carried out for sterilization.

In order to solve the problem, as mentioned previously, there are proposed a method of using an alkali metal salt of citric acid (Japanese Unexamined Patent Publication No. 51,054/1989), a method of adding chitosan (Japanese Unexamined Patent Publication No. 144,660/1992) and a method of degrading milk protein with a protease (Japanese Unexamined Patent Publication No. 23,867/1989), but either of these methods fails to improve stabilities against acids and heat satisfactorily but conversely gives rise to bitterness or astringency owing to the protein degradation, thus resulting in badly impaired taste as a food. Degradation of milk protein decreases markedly the emulsifying capacity and as a result causes such problems as impairment of the substantial taste of milk protein.

On the other hand, there is proposed a use of whey protein under acid conditions (Japanese Unexamined Patent Publication No. 54,635/1985), but a report is presented that in the case of its combined use with casein protein, whey protein as such can be used but with poor whipping property being realized, whereas whey protein only after being treated with a protease exhibits desirable whipping property (Japanese Unexamined Patent Publication No. 257,838/1990). As is stated in the above, the utilization methods proposed for whey protein vary with the reports. Whey protein alone, though it possesses peculiar flavor, provides creams having different flavor from fresh cream, which creams therefore can in no way be used as an acid-resistant whipped cream based totally on milk fat.

The acid-resistant creams proposed so far in the past are subjected to sterilization as they contain souring agents, whereas the present invention makes a striking construction difference from the prior art in that the instant invention comprises producing an acid-resistant cream in advance and adding souring agents on the occasion of whipping. In fact, the proportion occupied by proteins in such an acid-resistant cream is greater, and when such cream is used in the form of an oil-in-water type emulsion, such emulsion is significantly affected by the used emulsifiers and other constituents.

From the standpoint of this, the present inventors conducted intensive research studies, and as a result, found that a cream containing the emulsification system and edible fiber and/or modified starch as claimed herein, when a weight ratio of casein protein/whey protein ranges from 0.24 to 3.8, develops a flavor similar to that of fresh cream while it possesses improved acid resistance. In the case of neutral creams not requiring acid resistance, the weight ratio naturally may be not less than 3.8.

As the casein protein, there may be mentioned whole milk powder, powdered skimmed milk, sodium caseinate and the like, and such casein proteins are added at ratios in the above range. Examples of whey protein include cheese whey being produced as a by-product in the manufacture of cheese and casein whey (acid whey) being obtained as a by-product in the production of casein, and there may be used any of processed whey proteins such as those supplemented with fats, minerals, etc., those having their protein contents increased by various methods such as ultrafiltration, ion exchange and gel permeation, and individual constituent components of the whey protein such as lactalbumin, which are added as a whey protein at ratios in the above-described range.

The creams which contain proteins of egg or soybean origin other than milk protein, can be used freely without any trouble as far as they show neutrality, and in cases where they are intended to be used under acid conditions, attention must be paid to the weight ratio of casein protein/whey protein, whereby any protein may be used only if it possesses acid resistance; even proteins which have no acid resistance can also be used at ratios in the range of 0.24 to 3.8.

In the present invention, it is another characteristic feature to provide the specifically defined emulsification system consisting of lecithin and saturated fatty-acid esters of a polyglycerol. With reference to lecithin as used in this invention, there may normally be utilized a paste-like substance being composed mainly of phospholipids such as phosphatidyl choline, phosphatidyl ethanolamine, phosphatidyl inositol and phosphatidic acid and having an oil content of 40 to 30% by weight, which is manufactured as a by-product on the occasion of oil expression of soybeans, and in addition, other vegetable lecithins originated from rapeseed oil, safflower oil, corn oil, etc. may be used, while egg yolk lecithin may also be employable. Furthermore, highpurity, powdered lecithin having a content of phospholipids raised by defatting the paste-like lecithin may be used, and there is also used fractionated lecithin having a phosphatidyl choline content in lecithin increased. Such lecithins are added at a ratio of 0.01 to 0.5% by weight as a phospholipid against the resultant cream composition. In the case of the addition ratio being less than 0.01% by weight, the resultant emulsion itself is sufficiently stable but the resulting foamed whipped product shows inferior shape retention, whereas the addition ratio of not less than 0.5% by weight not only results in lowered overrun value and deteriorated flavor but also, upon addition of acid substances, brings about destruction of the emulsification, thus exerting adverse effects on shape retention and texture of the resultant cream and the like.

Fatty acid esters of polyglycerols are esterified products of polyglycerols, which are etherified polymers ordinarily formed through condensation of 2 to 10 moles of glycerol, with fatty acids having a number of carbon atoms of 12 to 22, and have already been proposed in the previously mentioned patent applications. The present invention is characterized in that there are employed 0.05 to 1.2% by weight of a saturated fatty acid ester of a polyglycerol (namely, pentaglycerol or higher polymers) having a mean glycerol polymerization degree of not less than 5 and an HLB value of not less than 9 as well as 0.02 to 0.6% by weight of a saturated fatty acid ester of a polyglycerol (namely, diglycerol or higher polymers) having a mean glycerol polymerization degree of not less than 2 and an HLB value of less than 7. The term "HLB value" as used herein is understood to be calculated in accordance with the Griffin's equation.

The fatty acid esters of polyglycerols in which unsaturated fatty acids are used as a fatty acid constituent are often used to enhance the shape retention of the resultant whipped creams which are intended for use in the neutral pit range, but render the whipping property of the creams inferior under acid conditions, with the badly coarse cream surface being particularly noted. In the latter case, even their combined use with fatty acid esters of sucrose does not serve a useful purpose to improve the acid resistance, while on the other hand, their concomitant use with organic acid esters of monoglycerides encounters difficulties in terms of shape retention. Under these circumstances, the present inventors conducted intensive research and as a result, have achieved the objective of the present invention by combining the said two kinds of saturated fatty acid esters of polyglycerols.

The saturated fatty acid ester of a polyglycerol having a mean glycerol polymerization degree of not less than 5 and an HLB value of not less than 9, when used at a ratio of less than 0.05% by weight, fails to attain satisfactory overrun, while in the case of the addition ratio being not less than 1.2% by weight, it provides whipped creams with the so-called returning (softening) phenomenon or diminished whipping property. The saturated fatty acid ester of a polyglycerol having a mean glycerol polymerization degree of not less than 2 and an HLB value of less than 7 is used at an addition ratio of 0.02 to 0.6% by weight, and preferably, a combined use is made of 0.01 to 0.3% by weight of the saturated fatty acid ester of a polyglycerol having a mean glycerol polymerization degree of 2 to 4 and 0.01 to 0.3% by weight of the saturated fatty acid ester of a polyglycerol having a mean glycerol polymerization degree of not less than 5.

The saturated fatty acid ester of a polyglycerol having a mean glycerol polymerization degree of 2 to 4 and an HLB value of less than 7, when added to the whipping cream composition, serves an useful purpose to improve the shape retention of the resultant creams, but if it is at an addition ratio of less than 0.01% by weight provides the resultant creams with inferior shape retention, while in the case of addition at a ratio of not less than 0.3% by weight, it gives oil-scented creams, resulting in no practical utility in terms of flavor. The saturated fatty acid ester of a polyglycerol having a mean glycerol polymerization degree of not less than 5 and an HLB value of less than 7, when used at an addition ratio of less than 0.01% by weight, causes the resultant creams to undergo such phenomena as coagulation and whey separation during transport, and when added at a ratio of not less than 0.3% by weight, produces oil-scented creams, thus being of no practical utility in terms of flavor. By combining two different kinds of the saturated fatty acid esters of polyglycerols as described above, the present inventors succeeded in preventing the resultant creams from coagulation and whey separation during transport and also in producing the whipped creams provided with improved shape retention and excellent flavor.

In the case of creams intended for use in the neutral pH range alone, 0.01 to 0.3% by weight of an unsaturated fatty acid ester of a polyglycerol having a mean glycerol polymerization degree of not less than 2 may be used in combination, and such combined use can provide whipped creams with improved shape retention and texture. The combined use can be done in different ways, and such unsaturated fatty acid ester of a polyglycerol may be replaced for portion of the saturated fatty acid ester of a polyglycerol having an HLB value of less than 7 or may be supplemented additionally. The compound when used at a ratio of less than 0.01% by weight fails to produce any effect which could be attained by its addition, while at an addition ratio of not less than 0.3% by weight, it provides the whipped creams with lowered overrun value, inferior texture in turn and oil scent, thus deteriorated flavor.

Further characteristic feature of the present invention constitutes the use of 0.05 to 5% by weight of one or not less than two of edible fibers selected from a group consisting of cellulose, hemicellulose and sparingly digestible dextrin and/or modified starch. Such edible fibers and modified starch not only exhibit acid resistance but also improve water-holding property of creams, prevent water separation, confer freeze resistance and particularly cause desirable effects on the flowering property during squeezing of unfrozen pre-whipped cream. In the present invention, consequently, these components are one of the essential ingredients.

Cellulose is available in a variety of commercial products, and microcrystalline cellulose and microfibrillated cellulose being rendered finely pulverized by a special mechanical treatment are suitable in the present invention. Hemicellulose is produced from husks of seeds for oil stuff after removal of oils and fats and proteins or residues after removing starch, etc. from cereals, and various types of hemicellulose can be selected in terms of flavor. Sparingly digestible dextrin is understood to designate a special type of dextrin separated and purified by heat treatment or enzymatic treatment of easily digestible starch and enzyme-treated products of naturally occurring polysaccharides such as guar gum. In addition to such naturally occurring edible fibers, furthermore, synthetic edible fibers such as polydextrose are comprehended in the present invention. The modified food starch is edible starch produced for example by subjecting starch to esterification through acetylation or etherification with alcohols. Such edible fibers and modified food starch are added in a proportion of 0.05 to 5% by weight of the total weight of the resultant cream composition; the addition ratio of less than 0.05% by weight is not effective in achieving improved water holding property and whipping property, whereas not less than 5% by weight provides the resultant creams with an increased viscosity, lowered overrun value and inferior flavor.

There have been disclosed patent applications (Japanese Unexamined Patent Publication Nos. 100,167/1986 and 76,281/1993) in which water-soluble fibers and cellulose are used, but these patent application aim primarily at the improved freeze resistance of the resultant creams. On the other hand, a patent application (Japanese Unexamined Patent Publication No. 78,704/1994) relating to an acid-resistant whipping cream based on water-soluble hemicellulose has been published, but it is proven that the desired acid resistance cannot be obtained using water-soluble hemicellulose alone. Only by having the protein composition used in combination with the emulsifier, both of which are specifically defined in the present invention, the resultant composition can achieve the desirable function satisfactorily.

In the present invention, the content of total solids inclusive of oils and fats in the cream composition is maintained in the range of 35 to 70% by weight. Less than 35% by weight in solid content produces whipped creams with increased water separation and inferior shape retention, whereas not less than 70% by weight gives rise to an increase in viscosity of the creams, resulting in decreased overrun and deteriorated flavor. It is added that the sugar substance is formulated in such a way that it occupies 5 to 40% by weight of the total solids. Addition and formulation of such sugar substance is indispensable for providing the whipped cream with increased water holding property and well kept shape retention. As a sugar substance, there are formulated a variety of sugar substances, such as different starch syrups produced by hydrolysis of starch and reduced starch hydrolysates resultant from hydrogenation of the same, monosaccharides being exemplified by glucose, disaccharides exemplified by lactose, etc. and their reduced substances, according to the desired degree of sweetness of the resultant cream.

The present invention is furthermore characterized by ultra-high temperature sterilization treatment (UHT treatment) to produce creams being preservable for a prolonged period of time. It is well known that in carrying out the UHT treatment, there are encountered several problems in association with the resulting deterioration of the whipping function, such as a longer time required for foaming, poor shape retention after foaming and increased susceptibility to water separation, as compared with the high-temperature short-time pasteurization and flash pasteurization methods. It is further another characteristic feature of the present invention that such problems have been able to be solved successfully.

In order to provide the resultant cream with enhanced physical properties, the whipping cream according to this invention may be admixed with naturally occurring polysaccharides, such as carrageenin, gum xanthanum and pectin, etc. and synthetic stabilizers, such as carboxymethylcellulose and methylcellulose, in addition to the above-mentioned ingredients. Furthermore, small quantities of polyphosphates and phosphates as well as suitable amounts of fragrances or perfumes are added. In addition to the above-described emulsifiers, there may be added small quantities of fatty acid esters of propylene glycol, fatty acid esters of sucrose, enzyme-treated lecithins, organic acid esters of monoglycerides, sorbitan fatty acid esters, etc.

The production process for the whipping creams of the present invention is not particularly limited, and may be the same as the ones as ordinarily brought into commercial practice; namely, lecithin and the lipophilic fatty acid esters of a polyglycerol are dissolved or dispersed in required quantities in an oil phase warmed at 60° to 70° C., while the protein source, phosphates, stabilizers, hydrophilic fatty acid esters of a polyglycerol, sugar substance, etc. are dissolved in water by heating at 60° to 70° C. and then admixed with the oil-phase dispersion, followed by stirring for 30 min at 70° to 75° C. to prepare the primary emulsion; the solution mixture is passed through a homogenizer usually at a pressure of 20 to 200 kg/cm$^2$ to thereby allow homogenization and then the ultra-high temperature sterilization treatment is conducted to produce a foamable oil-in-water type emulsified composition according to the present invention.

Needles to say, the ultra-high temperature sterilization treatment as referred to herein may be by use of either method of indirect heating and direct heating, and ordinarily, the sterilization treatment can be carried out, while the product temperature of 120° to 150° C. and treatment period of 10 to 2 seconds are taken as a standard. Following the ultra-high temperature sterilization treatment, the resultant composition can be subjected again to homogenization at 0 to 200 kg/cm$^2$, cooled to a temperature of around 5° C. left on standing overnight and then packaged by use of a sterile packing machine in the form of a finished product to thereby manufacture the desired whipping cream.

Such sterile cream is whipped as such or after addition of sweetening agents such as sugar or wines and liquors according to the desired taste to thereby find application in the form of either normal whipping cream or pre-whipped cream. Alternatively, the sterile cream is whipped after being admixed with various fruits or fruit juices and sourtasting materials such as yogurt. Referring to the acid whipping cream, a pH value of less than 3.8 after addition of souring agents means that the resultant cream tastes too sour, not being fit for food. In the case of the cream according to the present invention, the sterile whipping cream as produced by the above procedure, even after being formulated with souring agents and sweetening agents at a weight ratio of 80:20 to bring a pH value down to 3.8, can be used as an ordinary whipping cream or pre-whipped cream, thus permitting a great variety of cream products to be manufactured easily.

The examples are described below to illustrate in more detail the construction and effects of the present invention, but it goes without saying that the present invention is in no way understood to be limited by such examples, wherein the terms "part" and "percentage" are meant to be on the weight basis.

EXAMPLE 1

Investigation of emulsifiers:

[Basic formulation and procedure]

| | |
|---|---|
| A 8:2 oil and fat mixture of palm kernel oil and hardened palm kernel oil and fat (m.p., 28° C.) | 27.8 parts |
| Sodium caseinate | 0.2 part |
| Cream cheese whey (containing 36% of milk fat and 6.9% of whey protein) | 6.0 parts |
| Dibasic potassium phosphate | 0.03 part |
| Sodium hexametaphosphate | 0.08 part |
| Pine fiber (sparingly digestible starch, produced by Matsutani Kagaku Kogyo Co. of Japan) | 0.5 part |
| Maltose | 10.0 parts |
| Corn syrup (a solid content of 70%) | 12.0 parts |
| Microfibrillated cellulose (Selish FD-100L, produced by Daicel Chem. Ind. Ltd., a solid content of 25%. The term "part" as referred to in this specification is to be meant as the part based on 100% of an effective solid content) | 0.25 part |
| Water | The remainder to make up to 100 parts. |

The emulsifiers to be described in the experiment examples and comparison examples are as follows:

Soy lecithin: as produced by True Lecithin MFG. Co., Ltd. (a phospholipid content of 62%).

MSW-750: as produced by Sakamoto Yakuhin Kogyo Co., Ltd. (decaglycerol monostearate, HLB of 14.5. A water-containing paste containing 40% of the effective component. The term "part" as referred to in this specification is to be meant as the part based on 100% of an effective solid content).

DAS-750: as produced by Sakamoto Yakuhin Kogyo Co., Ltd. (decaglycerol decastearate, HLB of 3.4).

DAO-750: as produced by Sakamoto Yakuhin Kogyo Co., Ltd. (decaglycerol decaoleate, HLB of 3.4).

MS-310: as produced by Sakamoto Yakuhin Kogyo Co., Ltd. (tetraglycerol monostearate, HLB of 8.4).

PS-310: as produced by Sakamoto Yakuhin Kogyo Co., Ltd. (tetraglycerol pentastearate, HLB of 2.7).

The oil and fat were warmed at 60° to 65° C. and admixed with an oil-soluble emulsifier, followed by stirring to allow uniform dispersion and dissolution. Dibasic potassium phosphate, sodium caseinate, cream cheese whey and emulsifier were dissolved in the water phase, and the solution was warmed at 60° to 65° C. and admixed with the above-mentioned oil and fat. The solution mixture was maintained at 70° to 75° C. and admixed with pine fiber, maltose, corn syrup and microfibrillated cellulose, under stirring, followed by stirring for 30 min and addition of an aqueous solution of sodium metaphosphate to give the primary emulsion.

The emulsion solution was fed in a homogenizer under homogenization pressure of 50 kg/cm$^2$, then subjected to sterilization treatment by way of the direct heating method at 145° C. for 4 seconds in a ultra-high temperature sterilization facility (manufactured by Iwai Machinery Ind., Ltd. of Japan), and homogenized again under homogenization pressure of 50 kg/cm$^2$, followed by immediate cooling at about 5° C.

The solution was left on standing overnight to produce a whipping cream.

The whipping cream was determined for the typical properties in accordance with the below-described testing items, and by mixing 80 parts of the whipping cream (pH. 6.4) with 10 parts of 5-fold concentrated lemon juice, 5 parts of sucrose and 5 parts of water, whipping was done (the resulting cream showed a pH 4.0), followed by determination of the typical properties in the same manner.

The results are shown in Table 1.

TABLE 1

| | Investigation on emulsifiers | | | | | | |
|---|---|---|---|---|---|---|---|
| | Example No. | | | | | | |
| | Experiment Example | | | | Comparison Example | | |
| | 1 | 2 | 3 | 4 | 1 | 2 | 3 |
| Composition of emulsifier, %: | | | | | | | |
| Soy lecithin | 0.08 | 0.12 | 0.12 | 0.12 | — | 0.12 | 0.12 |
| MSW-750 | 0.32 | 0.16 | 0.16 | 0.16 | 0.16 | — | 0.16 |
| DAS-750 | 0.22 | 0.11 | 0.14 | 0.11 | 0.11 | 0.11 | — |
| PS-310 | 0.06 | 0.03 | — | — | 0.03 | 0.03 | — |
| DAO-750 | — | — | — | 0.03 | — | — | — |
| MS-310 | — | — | — | — | — | 0.16 | — |
| Properties of the resulting cream-like composition: | | | | | | | |
| Viscosity | 180 | 135 | 120 | 150 | 110 | 170 | 140 |
| Whipping time (min/sec) | 5'49" | 4'03" | 4'13" | 3'50" | 8'20" | 4'20" | 4'40" |
| Overrun, % | 240 | 198 | 204 | 190 | 260 | 120 | 170 |
| Shape retention | A | A | B | A | D | B | D |
| Texture | ⊚ | ⊚ | ○ | ⊚ | ○-x | ○ | ○-x |
| Water separation | − | − | ± | ± | ++ | ++ | ++ |
| Viscosity | 170 | 203 | 140 | 210 | 150 | 980 | 180 |

TABLE 1-continued

Investigation on emulsifiers

| | Example No. | | | | | | |
|---|---|---|---|---|---|---|---|
| | Experiment Example | | | | Comparison Example | | |
| | 1 | 2 | 3 | 4 | 1 | 2 | 3 |
| after exposure to heat shock | | | | | | | |
| *After being frozen and unfrozen:* | | | | | | | |
| Shape retention | A | A | B | B | D | C | D |
| Texture | ◉ | ◉ | ○ | ○ | X | ○ | X |
| Water separation | − | − | ±−+ | + | ++ | ++ | ++ |
| *Properties of the creams formulated with lemon juice:* | | | | | | | |
| Whipping time (min/sec) | 6'10" | 5'20" | 5'13" | 4'10" | 9'50" | 5'00" | 5'20" |
| Overrun, % | 260 | 210 | 215 | 210 | 280 | 135 | 195 |
| Shape retention | A | A | B | B | C | C | C |
| Texture | ◉ | ◉ | ○ | ○−X | ○ | ○ | ○ |
| Water separation | − | − | ± | ± | + | + | ++ |
| *After being frozen and unfrozen:* | | | | | | | |
| Shape retention | A | A | B | B | C | C | D |
| Texture | ◉ | ◉ | ○ | X | ○−X | ○−X | X |
| Water separation | − | − | ± | + | ++ | ++ | ++ |

Testing items:
(1) Viscosity: Viscosity, cps., as measured at 5° C. by use of a viscometer type B.
(2) Viscosity after exposure to heat shock: Viscosity, cps., as measured after leaving the cream on standing for 4 hours at 25° C. and then cooling at 5° C.
(3) Whipping time: A length of time required to reach the optimal foaming condition, when 500 ml of the cream composition is whipped by use of an electrically driven whipper (Kenmix manufactured by Aikosha Seisakusho Co., Ltd. of Japan).
(4) Shape retention: A degree of shape retention as assessed on the four-grade scale of Good (A), Slightly good (B), Fair (C) and Poor or of no practical utility (D).
(5) Texture: Texture of the whipped product assessed on the three-grade scale of Good (◉), Slightly good (○) and Poor or Of no practical utility (X).
(6) Water separation: An extent of water separation from the whipped product left on standing for 24 hours at 25° C., as assessed on the four-grade scale of None (−), Almost none (±), Slightly present (+) and Present (++).
(7) Typical properties of the whipped cream after being frozen and unfrozen: The same properties as described above, or shape retention, texture and water separation, as assessed for the foamed cream obtained by freezing the optimally foamed cream at −20° C., followed by preservation for one week and unfreezing in a refrigerator at 5° C..

The whipping creams as produced in Experiment Examples 1 and 2, in spite of their increased overrun values, exhibited excellent flavor and improved post-unfreezing typical properties and freeze resistance; the creams, when formulated with lemon juice to bring their pH value down to 4.0, showed a slightly prolonged whipping time but a higher overrun value than when not admixed with lemon juice.

With reference to saturated fatty acid esters of polyglycerols having an HLB value of less than 7, the combined use of not less than two different of such esters provided better typical properties than the sole use of either of them (Experiment Examples 2 and 3).

The whipped cream obtained by replacing an unsaturated fatty acid ester of a polyglycerol for part of the saturated fatty acid ester of a polyglycerol (Experiment Example 4) still exhibited good typical properties in the neutral pH range, but showed deteriorated surface texture under acid conditions brought about by the addition of lemon juice, with its tendency being markedly enhanced after unfreezing. In order to provide the whipped cream with satisfactory shape retention, soy lecithin was found to be required (Experiment Example 2 and Comparison Example 1), while the fatty acid ester of a polyglycerol having an HBL value of less than 7 was proven to be indispensable (Experiment Example 2 and Comparison Example 3).

The whipping cream, as prepared by using a saturated fatty acid ester of a polyglycerol having a mean glycerol polymerization degree of 4 and an HLB value of less than 9 for replacement of the saturated fatty acid ester of a polyglycerol having a mean glycerol polymerization degree of not less than 5 and an HLB value of not less than 9, produced oil scent and showed lowered overrun value, while it displayed a tendency of thickening; in addition, the said cream, when whipped as such and after the addition of lemon juice, provided the whipped product with inferior typical properties (Experiment Example 2 and Comparison Example 2).

In this example, investigation was conducted with a cream having a total fat content of 30% containing 2.2% of milk fat, and the cream (80 parts) of Experiment Example 1 was formulated with strawberry sauce (a solid content of 50% (20 parts) to produce a cream (pH 4.5), which provided the whipped cream with a whipping time of 4 min and 40 seconds and an overrun value of 200.

The strawberry-sauce formulated cream, with its total fat content as low as 24%, showed improved flavor, and as such at room temperature and after being frozen and unfrozen, exhibited the same typical properties as obtained in the case of Experiment Example 1.

The whipping cream of this example, whose whipping time and overrun value varied with the type of fruit juices added and the pH value of the resultant formulated creams, was found to achieve the objective of the present invention satisfactorily.

The creams of Experiment Examples 1 to 4 that fell in the scope of claim described in this specification were not observed to bring about either viscosity increase or whey separation, and consequently was able to be proven to be provided with adequate transport stability.

EXAMPLE 2

Investigation into the casein protein/whey protein ratio:

By changing the sodium caseinate/cream cheese whey ratio in the basic formulation of Example 1 and also adding skimmed milk and lactalbumin, a kind of whey protein, there were prepared creams having a total fat content of 30%.

By using the emulsification system of Experiment Example 1 as described in Example 1, various creams were prepared in accordance with the procedure of Example 1.

80 parts of the resultant cream was admixed with a solution consisting of 10 parts of 5-fold concentrated lemon juice, 5 parts of sucrose and 5 parts of water to produce a cream composition with a pH 4.0, which was whipped with the results being shown in Table 2.

TABLE 2

Investigation on the weight ratio of casein protein/whey protein

| | Example No. | | | | | |
|---|---|---|---|---|---|---|
| | Experiment Example | | | | Comparison Example | |
| | 1 | 2 | 3 | 4 | 1 | 2 |
| Sodium caseinate | 0.2 | 0.2 | 0.2 | 1.5 | — | 0.2 |
| Cream cheese whey | 10 | 6 | — | 5 | 6 | — |
| Powdered skimmed milk | — | — | 4 | — | — | 4 |
| Lactalbumin[4] | — | — | 0.2 | — | — | — |
| C/W weight ratio[1] | 0.25 | 0.41 | 2.96 | 3.68 | 0 | 4.62 |
| Properties of the resulting cream-like composition: | | | | | | |
| Whipping time (min/sec) | 6'00" | 6'10" | 5'40" | 5'10" | 4'30"[2] | —[3] |
| Overrun, % | 250 | 260 | 220 | 200 | 120 | |
| Shape retention | A | A | A | A | A | |
| Texture | ◉ | ◉ | ◉ | ◉ | ◉ | |
| Water separation | — | — | — | — | — | |
| After being frozen and unfrozen: | | | | | | |
| Shape retention | A | A | A | A | A | |
| Texture | ◉ | ◉ | ◉ | ◉ | ◉ | |
| Water separation | — | — | — | — | — | |

Notes:
[1]; The characters "C" and "W" stand for casein protein and whey protein, respectively. Sodium caseinate: Containing 10% of water and a protein content of 94% as calculated on a dry weight basis. Cream cheese whey: Containing 6.9% of whey protein. Powdered skimmed milk: Containing 34% of protein; calculated on the assumption that the skimmed milk is composed of 80% of casein protein and 20% of whey protein.
[2]; The cream, when homogenized under homogenization pressure of 50 kg/cm² both before and after UHT treatment, became floppy, with the result that the homogenization pressure as applied was lowered to 20 kg/cm².
[3]: The cream, upon formulation with lemon juice, turned scurry owing to protein coagulation, resulting in failure to whip.
[4]Lactoalbumin: containing 76.7% of whey protein.

As is obvious from Table 2, the casein protein/whey protein ratio did not affect the whipped cream when the said cream was used in the neutral pH range but caused adverse effects on the cream when used in the acid pH region.

In cases where emulsification was conducted with whey protein alone, the resulting cream possessed specific flavor peculiar to whey protein but widely different from fresh cream, and was able to withstand only lowered homogenization pressure, with its overrun value being decreased (Experiment Example 2 and Comparison Example 1).

When casein protein was added in the form of sodium caseinate, the casein protein/whey protein ratio of less than 4 is desirable in order to increase the homogenization pressure to thereby realize greater overrun value and also provide improved acid resistance (Experiment Example 4 and Comparison Example 2).

The casein protein/whey protein ratio of not less than 0.24 reduced the specific flavor peculiar to whey protein and produced the flavor similar to that of fresh cream (Experiment Example 1).

The whey protein may be used in the form of either a protein mixture, such as cream cheese whey, or a single component, such as lactoalbumin (Experiment Examples 1, 2, 4 and 3).

EXAMPLE 3

Acid-resistant, totally milk-fat based whipping cream

By using 40.6 parts of salt-free butter, 0.2 part of sodium caseinate, 3 parts of whole milk powder, 0.2 part of. lactoalbumin and the same emulsification system as used in Experiment 1 of Example 1, while utilizing the remaining sugars, starch, phosphates and microfibrillated cellulose at the same formulation ratios as set forth in the basic formulation of Example 1, there was prepared a cream (with a milk fat content of 35%).

The cream showed a whipping time of 4 min and 12 seconds and overrun value of 226, and exhibited excellent flavor comparable to that of fresh cream, while it caused no problem in terms of shape retention, texture and water separation even after being frozen and unfrozen. 80 parts of the cream was admixed with 20 parts of strawberry sauce to produce a cream composition having a pH 4.5. The cream composition, upon whipping, showed a whipping time of 2 min and 30 seconds and overrun value of 186, though its milk fat content decreased down to 28%, and also displayed excellent flavor, while it caused no problem in terms of shape retention, texture and water separation even after being frozen and unfrozen.

There has not yet been put so far on the market any totally milk-fat based whipping cream showing improved flavor, satisfactory acid resistance and a lowered fat content, but the present invention can provide the specific construction that enables such creams to be manufactured on the efficient, industrial-scale for the first time.

EXAMPLE 4

Pre-whipped cream intended for use under neutral and acid conditions

| [Formulation] | |
|---|---|
| A 8:2 oil and fat mixture of palm kernel oil and hardened palm kernel oil and fat (m.p., 28° C.) | 24.2 parts |
| Sodium caseinate | 1.5 part |
| Cream cheese whey (having the same composition as set forth in Example 1) | 5.0 parts |
| Dibasic potassium phosphate | 0.03 part |
| Sodium metaphosphate | 0.08 part |
| Colflo 67 (modified food starch produced by National Starch. & Chemical Co. of U.S.A.) | 0.5 part |
| Sucrose | 6.0 parts |
| Corn syrup (a solid content of 70%) | 21.0 parts |
| Microfibrillated cellulose | 0.25 part |
| Soy lecithin | 0.21 part |
| MSW-750 | 0.32 part |
| DAS-750 | 0.22 part |
| PS-310 or DAO-750 | 0.06 part |
| Water | 40.63 parts |

The procedure as described in Example 1 was followed and the resultant cream composition was homogenized under the same homogenization pressure of 140 kg/cm² both before and after the UHT treatment. The cream having a total fat content of 26% was whipped, filled in a whipping bag and frozen for 1 to 2 days at −20° C. After being unfrozen at 5° C., the cream was squeezed out of the bag, and the whipped cream was tested for the typical properties. On the other hand, 80 parts of the whipped cream was admixed with 20 parts of strawberry sauce, and the same procedure was conducted with the resultant cream (pH 4.8), with the results being shown in Table 3.

TABLE 3

Investigation on prewhipped creams

| Emulsification system | PS-310 | | DAO-750 | |
|---|---|---|---|---|
| Viscosity | 210 | SS-Formulated[2] | 200 | SS-formulated[2] |

Properties of the resulting cream-like composition:

| | | | | |
|---|---|---|---|---|
| Whipping time (min/sec) | 8'15" | 6'20" | 8'10" | 5'20" |
| Overrun, % | 210 | 180 | 201 | 140 |
| Hardness[1] | 44 | 70 | 64 | 95 |
| Shape retention | A | A | A | B |
| Texture | ⊙ | ⊙ | ⊙ | O–X |
| Water separation | — | — | — | — |

After being frozen and unfrozen:

| | | | | |
|---|---|---|---|---|
| Overrun, % | 205 | 175 | 194 | 100 |
| Hardness | 45 | 85 | 76 | 140 |
| Shape retention | A | A | A | B |
| Texture | ⊙ | ⊙ | ⊙ | X |
| Water separation | — | — | — | — |

Notes:
[1]: Hardness; as determined by filling a whipped cream densely in an overrun cup, immersing into the cream an adapter (20 mm in diameter) for viscous materials fitted with Fudoh Rheometer NRM-2010J-CW (manufactured by Fudoh Kogyo CO., Ltd. of Japan) at a sample plate speed of 300 mm/min and measuring hardness (g/cm$^2$) when the adapter reached 20 mm in depth.
[2]: The term "SS-formulated" designates "Strawberry sauce formulated"

The section of PS-310 exhibited satisfactory typical properties as a whipping cream under both neutral and acid conditions and also showed improved flavor. On the other hand, the section of DAO-750, which contained an unsaturated fatty acid as a fatty acid constituent for the fatty acid polyglycerol ester, showed good properties under neutral conditions but produced the tightened whipped cream under acidic conditions; the cream showed lowered overrun value and increased hardness, while it presented conspicuously coarse surface, and such tendency became much more striking after being frozen and unfrozen.

EXAMPLE 5

Investigation of edible fibers and modified food starch:

[Formulation]

| | |
|---|---|
| Hardened coconut oil (m.p., 36° C.) | 17.8 parts |
| Sodium caseinate | 0.2 part |
| Cream cheese whey (having the same composition as set forth in Example 1) | 6.0 parts |
| Modified food starch or sparingly digestible dextrin | Varied |
| Dibasic potassium phosphate | 0.03 part |
| Sodium metaphosphate | 0.08 part |
| Sucrose | 2.0 parts |
| Maltose | 7 to 7.75 parts |
| Corn syrup (a solid content of 70%) | 10.0 parts |
| Soy lecithin | 0.12 part |
| MSW-750 | 0.16 part |
| DAS-750 | 0.09 part |
| PS-310 | 0.03 part |
| Microfibrillated cellulose | Varied |
| Water | The remaining (to make up to 100 parts) |

The procedure as described in Example 1 was followed and the resultant cream composition was homogenized under the same homogenization pressure of 70 kg/cm$^2$ both before and after the UHT treatment. The cream having a total fat content of 20% was whipped as such (a total solid content of 40.1%) and also after mixing 80 parts of the same with 20 parts of strawberry sauce (the whipped cream had a pH 4.6), and the whipped creams were tested for the typical properties. Both exhibited excellent flavor, with the results being shown in Table 4.

TABLE 4

Investigation on edible fibers and modified food starch

| | Experiment Example | | | | Comparison |
|---|---|---|---|---|---|
| | 1 | 2 | 3 | 4 | Example 1 |

Ingredient formulated in varied amount:

| | | | | | |
|---|---|---|---|---|---|
| Pinefiber[1] | 0.5 | — | — | 0.5 | — |
| Colflo 67[1] | — | 0.5 | — | — | — |
| Maltose | 7.0 | 7.0 | 7.5 | 7.25 | 7.75 |
| Microfibrillated cellulose | 0.25 | 0.25 | 0.25 | — | — |

Properties of the resulting cream-like composition:

| | | | | | |
|---|---|---|---|---|---|
| Viscosity | 69 | 95 | 41 | 50 | 38 |
| Whipping time (min/sec) | 10'29" | 9'50" | 11'10" | 10'50" | 12'30" |
| Overrun, % | 250 | 260 | 260 | 245 | 265 |
| Shape retention | A–B | A–B | B–C | C | D |
| Texture | ⊙ | ⊙ | ⊙ | O | O–X |
| Water separation | ± | ± | ± | ±–+ | ++ |
| Viscosity after exposure to heat shock | 75 | 85 | 51 | 52 | 42 |

After being frozen and unfrozen:

| | | | | | |
|---|---|---|---|---|---|
| Shape retention | A–B | A–B | C | C | D |
| Texture | OO | O | OO | OO | X |
| Water separation | ± | ± | + | ++ | ++ |

Properties of the creams formulated with strawberry sauce:

| | | | | | |
|---|---|---|---|---|---|
| Whipping time (min/sec) | 5'00" | 4'30" | 6'11" | 5'40" | 6'40" |
| Overrun, % | 194 | 187 | 200 | 190 | 210 |
| Shape retention | A | A | B | B | C |
| Texture | ⊙ | ⊙ | ⊙ | O | O |
| Water separation | — | — | ± | ±–+ | + |

After being frozen and unfrozen:

| | | | | | |
|---|---|---|---|---|---|
| Shape retention | A–B | A–B | B–C | C | D |
| Texture | ⊙ | ⊙ | ⊙ | O | O–X |
| Water separation | ± | ± | ± | + | ++ |

Note: [1]. the same as described in Examples 1 and 4.

As is evident from Table 4, the combined use of microfibrillated cellulose with sparingly digestible dextrin or modified food starch offered the advantage that the resultant cream excelled in shape retention and water separation (Experiment Examples 1. 2 and 3, 4). Also, microfibrillated cellulose contributed more effectively to the improved shape retention and water separation than sparingly digestible dextrin and modified food starch (Experiment Examples 3 and 4).

On the other hand, the comparison system (Comparison Example 1) using neither edible fiber nor modified food starch was not suited for commercialization in terms of shape retention and water separation.

The present invention is characterized in that the instant invention permits the resultant cream to be formulated with souring agents, wherein the formulated cream in spite of its lowered fat content can achieve the excellent effects in terms of shape retention and water separation, as may be evident from Experiments 1 to 3.

The cream composition according to the present invention can be decreased in total fat content as low as 16% for example by formulating with 20 parts of strawberry sauce to thereby produce a heretofore unknown, low-fat cream, which is similar to ice cream, yet can overcome difficulties in connection to the shape retention and water separation at ambient temperature and exhibits satisfactory typical properties even after being frozen and unfrozen. Such cream has not yet been put on the market in the past, and can therefore be said to be an epoch-making product.

What is claimed is:

1. A freeze-resistant whipping cream composition comprising:
   (a) 35–70 weight % total solids including
      (i) 16–40 weight % oil and fat, and
      (ii) 0.3 to 6 weight % combined casein protein and whey protein at a casein protein/whey protein weight ratio of at least 0.24;
   (b) an emulsifier comprising, based on the composition, 0.01 to 0.5 weight % lecithin, 0.05 to 1.2 weight % saturated fatty-acid ester of a polyglycerol having a mean glycerol polymerization degree of not less than 5 and an HLB value of not less than 9, and 0.02 to 0.6 weight % saturated fatty-acid ester of a polyglycerol having a mean glycerol polymerization degree of not less than 2 and an HLB value of less than 7, and
   (c) 0.05 to 5 weight %, based on the composition, of at least one edible fiber selected from the group consisting of cellulose, hemicellulose, sparingly digestible dextrin, modified starch, polydextrose, and a combination thereof.

2. The whipping cream composition of claim 1 wherein the protein further includes non-milk protein.

3. The whipping cream composition of claim 1, wherein the casein protein/whey protein weight ratio is 0.24–3.8, which effects acid resistance.

4. The whipping cream composition of claim 2, wherein the casein protein/whey protein weight ratio is 0.24–3.8, which effects acid resistance.

5. The whipping cream composition of claim 3 further comprising a souring agent or agents in an amount sufficient to effect a pH as low as 3.8.

6. The whipping cream composition of claim 4 further comprising a souring agent or agents in an amount sufficient to effect a pH as low as 3.8.

7. The whipping cream composition of claim 1, wherein the casein protein/whey protein weight ratio is not less than 3.8, for neutral-pH use.

8. The whipping cream composition of claim 2, wherein the casein protein/whey protein weight ratio is not less than 3.8, for neutral-pH use.

9. The whipping cream composition of claim 7 wherein the emulsifier further comprises, in an amount of 0.01 to 0.3 weight %, an unsaturated fatty-acid ester of a polyglycerol having a mean glycerol polymerization degree of not less than 2.

10. The whipping cream composition of claim 1, in a whipped form.

11. The whipping cream composition of claim 2, in a whipped form.

12. The whipping cream composition of claim 3, in a whipped form.

13. The whipping cream composition of claim 4, in a whipped form.

14. The whipping cream composition of claim 5, in a whipped form.

15. The whipping cream composition of claim 6, in a whipped form.

16. The whipping cream composition of claim 7, in a whipped form.

17. The whipping cream composition of claim 8, in a whipped form.

18. The whipping cream composition of claim 9, in a whipped form.

19. The whipping cream composition of claim 10 in a frozen form.

20. The whipping cream composition of claim 11 in a frozen form.

21. The whipping cream composition of claim 12 in a frozen form.

22. The whipping cream composition of claim 13 in a frozen form.

23. The whipping cream composition of claim 14 in a frozen form.

24. The whipping cream composition of claim 15 in a frozen form.

25. The whipping cream composition of claim 16 in a frozen form.

26. The whipping cream composition of claim 17 in a frozen form.

27. The whipping cream composition of claim 18 in a frozen form.

28. A process for producing the whipping cream composition of claim 1, comprising the steps of:
   a) emulsifying the composition; and
   b) heating the emulsified composition at a temperature of 120°–150° C. and for a time sufficient to effect sterilization.

* * * * *

UNITED STATES PATENT AND TRADEMARK OFFICE
CERTIFICATE OF CORRECTION

PATENT NO. : 5,609,904
DATED : March 11, 1997
INVENTOR(S) : Hen-Sik KOH and Ichizo HAYAMA It is certified that error appears in the above-indentified patent and that said Letters Patent is hereby corrected as shown below:

Column 1, line 45, change "suck" to --such--;

Column 3, line 7, delete "a", and after "of such", insert --a--;

Column 6, line 31, change "pit" to --pH--;
    line 49, change "polyg" to --poly--;
    line 50, change "lycerol" to --glycerol--; and
    line 63, after "is" insert --used--;

Column 8, line 24, change "dis" to --di--; and
    line 25, change "accharides" to --saccharides--;

UNITED STATES PATENT AND TRADEMARK OFFICE
CERTIFICATE OF CORRECTION

PATENT NO. : 5,609,904
DATED : March 11, 1997
INVENTOR(S) : Hen-Sik KOH and Ichizo HAYAMA It is certified that error appears in the above-indentified patent and that said Letters Patent is hereby corrected as shown below:

Column 13, line 38, change "Lactoalbumin" to --Lactalbumin--; and line 61, change "Lactoalbumin" to --Lactalbumin--; and Column 16, line 33, change "OO" (all three occurrences), to --O--.

Signed and Sealed this

Fourteenth Day of April, 1998

Attest:

BRUCE LEHMAN

*Attesting Officer*     *Commissioner of Patents and Trademarks*